J. E. FINLEY.

Churn.

No. 68,560.

Patented Sept. 3, 1867.

WITNESSES:

INVENTOR.

John E. Finley

United States Patent Office.

JOHN E. FINLEY, OF MEMPHIS, TENNESSEE.

Letters Patent No. 68,560, dated September 3, 1867.

---

IMPROVEMENT IN CHURNS.

---

*The Schedule referred to in these Letters Patent and making part of the same.*

---

Be it known that I, JOHN E. FINLEY, of Memphis, county of Shelby, and State of Tennessee, have invented a new and useful Improvement in Churns; and I do hereby declare that the following is a full, clear, and exact description of the construction and operation of the same, reference being had to the annexed drawings, making a part of this specification, in which—

Figure 1:
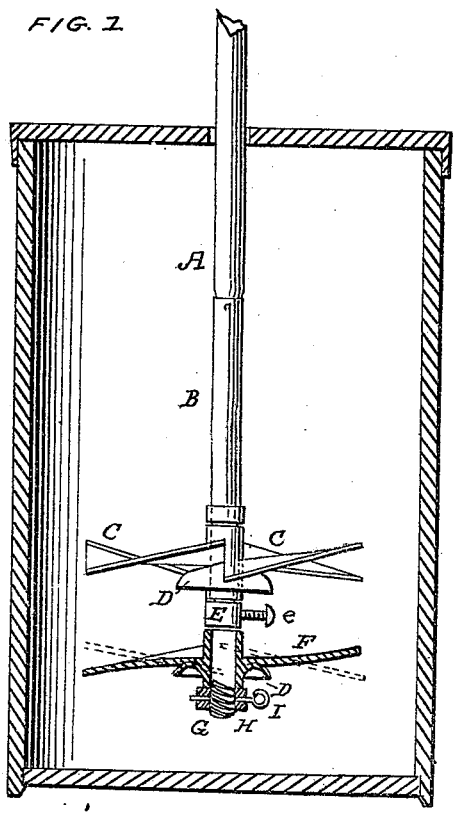
Figure 2:
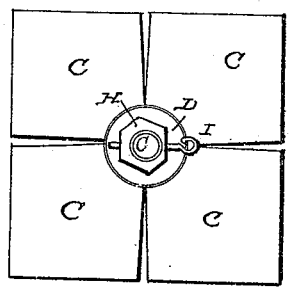

Figure 1 is a perspective view.
Figure 2, a sectional view.

A, staff; B, thimble; C C C, flanges; D D, air-cups; E, centre thimble; e, thumb-screw; F F, flanges; G, screw; H, nut; I, key.

I construct my churn in the usual tub form. To the staff A, I attach two wheels C C C F F, with four flanges each, with the flanges set in such a manner that when the staff A is operated the flanged wheels C C C F F will revolve in counter or opposite directions. To the flanged wheels C C C F F, I attach two air-cups D D, in such a manner as to carry the air into the cream. Between the flanged wheels C C C F F, I place a thimble, E, with the thumb-screw e to keep the wheels C C C F F in place. At the bottom of the thimble B, I place the screw G, with the nut H and key I, in such a way that the wheels C C C F F, with the middle thimble E, can be removed at any time for the purpose of cleansing. The object of the key I is to prevent the nut H from becoming unscrewed when the dasher A is operated.

The object of my invention is to give to the flanged wheels C C C F F an opposite revolving motion, while the air-cups D D carry the air throughout the cream, thus hastening butter-making.

I claim the combination of the flanged wheels C C C F F with the air-cups D D, the thimble B, and middle thimble E, and thumb-screw e, the nut H and key I, for the purpose herein set forth.

JOHN E. FINLEY.

Witnesses:
C. F. HAUSELMANN,
OLIVER H. COX.